United States Patent
Brand et al.

(10) Patent No.: US 7,581,378 B2
(45) Date of Patent: Sep. 1, 2009

(54) ANTI-ICING APPARATUS AND METHOD FOR AERO-ENGINE NOSE CONE

(75) Inventors: Joseph Horace Brand, Mississauga (CA); Michael John Dowhan, Milton (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 114 days.

(21) Appl. No.: 11/494,617

(22) Filed: Jul. 28, 2006

(65) Prior Publication Data
US 2009/0120099 A1 May 14, 2009

Related U.S. Application Data

(63) Continuation of application No. PCT/CA2005/000090, filed on Jan. 26, 2005.

(30) Foreign Application Priority Data
Jan. 30, 2004 (CA) .................................... 2456563

(51) Int. Cl.
*F02G 3/00* (2006.01)
(52) U.S. Cl. .................... 60/39.093; 60/779; 244/134 R
(58) Field of Classification Search .................. 60/779, 60/39.093; 244/134 R
See application file for complete search history.

(56) References Cited

U.S. PATENT DOCUMENTS

| | | | | |
|---|---|---|---|---|
| 2,499,832 A | * | 3/1950 | Palmatier | ................ 237/12.3 A |
| 2,712,727 A | * | 7/1955 | Morley et al. | ............ 60/39.093 |
| 3,834,157 A | * | 9/1974 | Hoffmann | ................ 60/39.093 |
| 3,925,979 A | | 12/1975 | Ziegler | |
| 4,485,619 A | | 12/1984 | Moore et al. | |
| 4,546,604 A | | 10/1985 | Moore et al. | |
| 4,674,714 A | * | 6/1987 | Cole et al. | .............. 244/134 B |
| 4,738,416 A | * | 4/1988 | Birbragher | .............. 244/134 B |
| H000648 H | * | 7/1989 | Tran | ....................... 244/134 B |
| 4,863,354 A | * | 9/1989 | Asselin et al. | .......... 416/245 R |
| 4,865,291 A | * | 9/1989 | Briscoe et al. | ............ 251/30.02 |
| 4,941,317 A | * | 7/1990 | Ivey et al. | ................. 60/39.093 |
| 5,011,098 A | | 4/1991 | McLaren et al. | |
| 5,228,643 A | * | 7/1993 | Manda et al. | ........... 244/134 B |
| 6,027,078 A | * | 2/2000 | Crouch et al. | ............... 244/204 |
| 2007/0220899 A1 | * | 9/2007 | Earith Thomas et al. | ...... 60/779 |

* cited by examiner

*Primary Examiner*—William H Rodriguez
(74) *Attorney, Agent, or Firm*—Ogilvy Renault LLP

(57) ABSTRACT

An aero-engine nose cone anti-icing system (10) using a rotating heat pipe (12) is provided to replace the current method of blowing hot compressor bleed air over the nose cone surface. Heat is transferred from a hot source (36) within the engine (22) to the nose cone (18) through a rotating heat pipe (12) along the central shaft (16). A condenser (20) and evaporator (14) are provided which are adapted to the heat transfer requirements and space constraints in the engine (22).

10 Claims, 12 Drawing Sheets

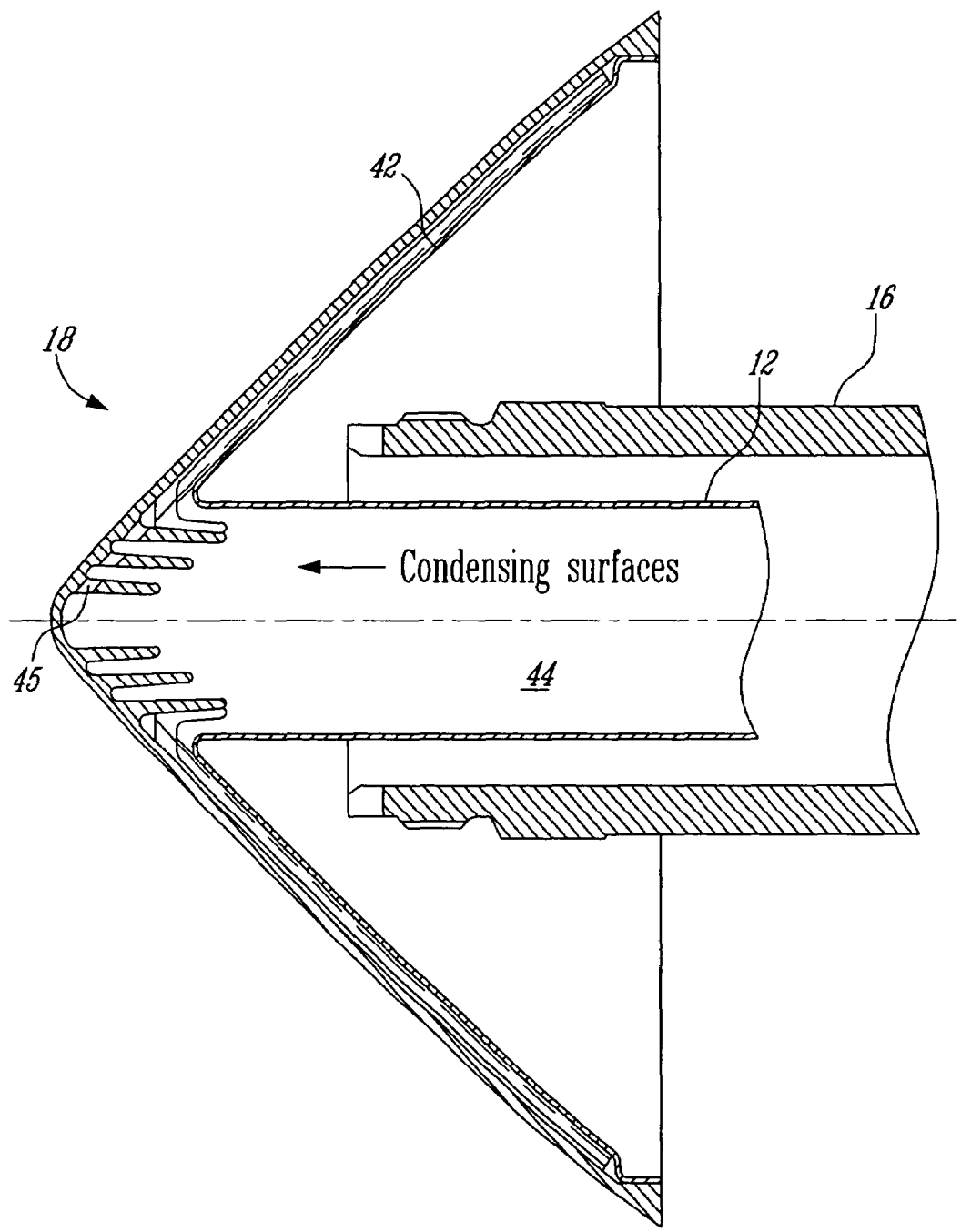
FIG_2B

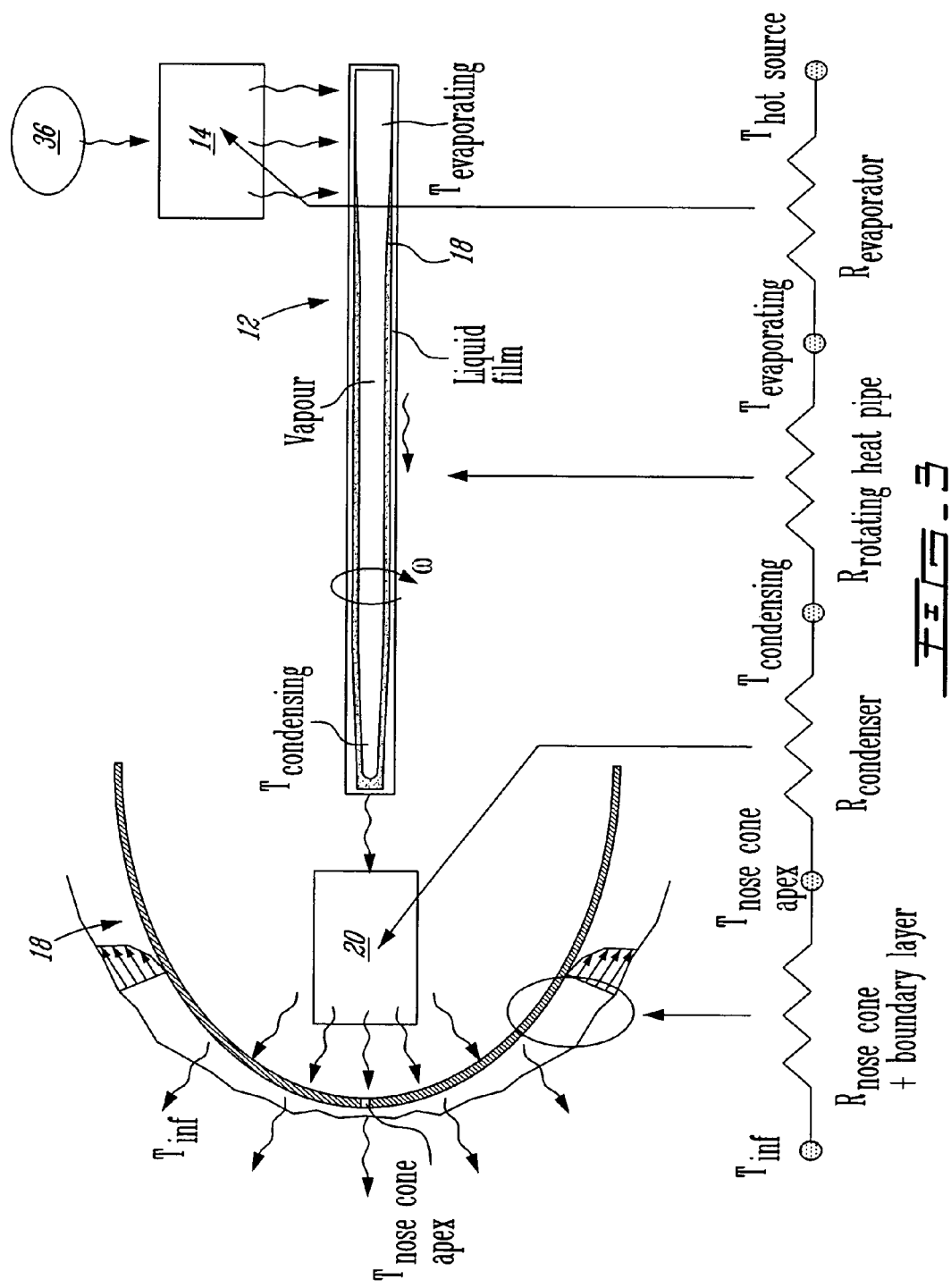

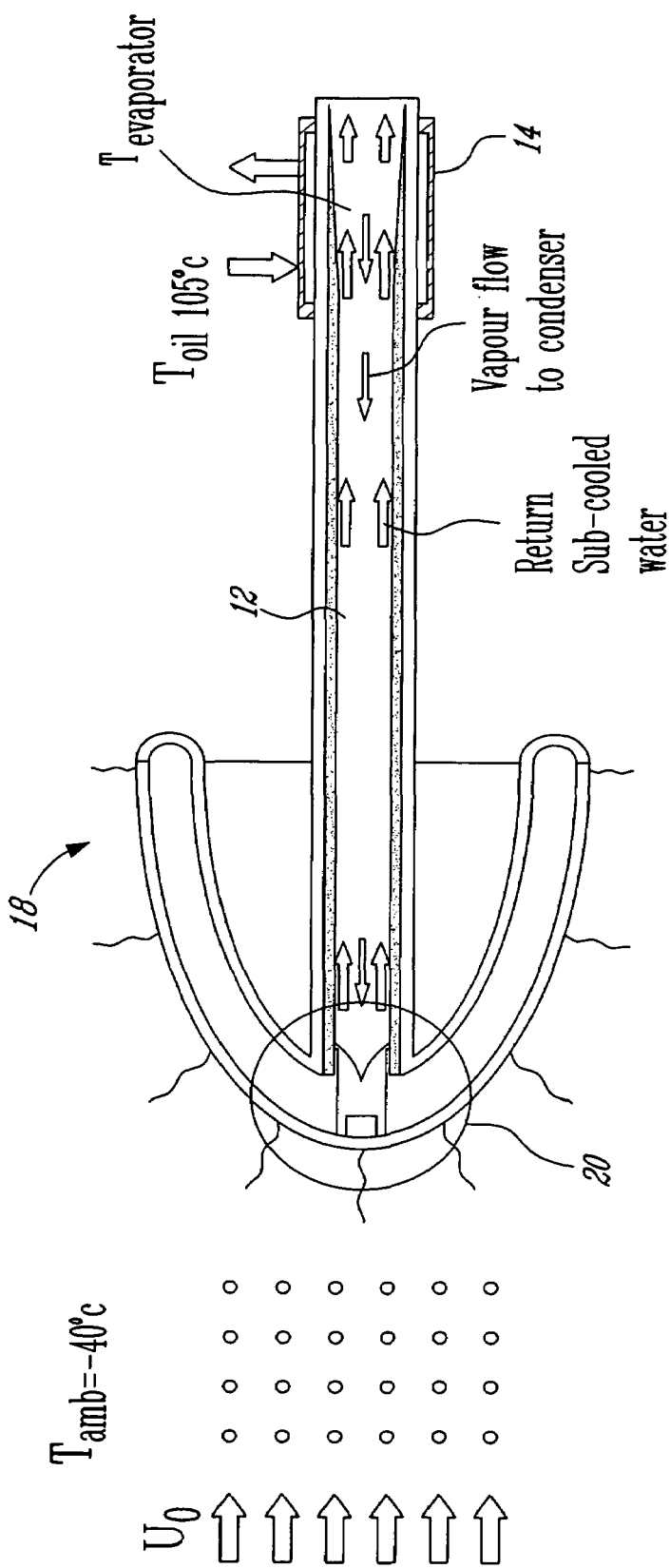

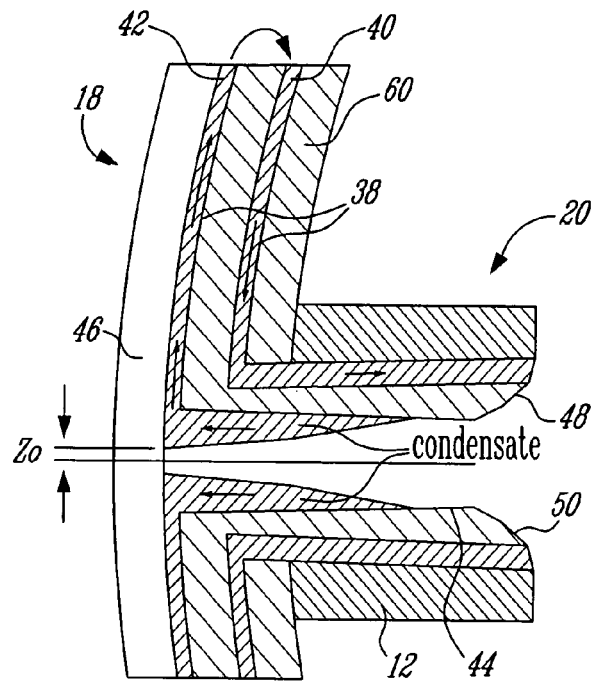
FIG_7
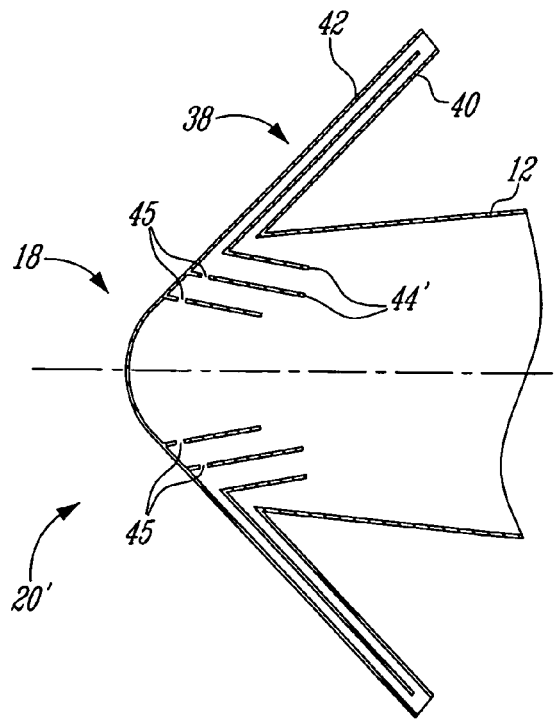
FIG_8

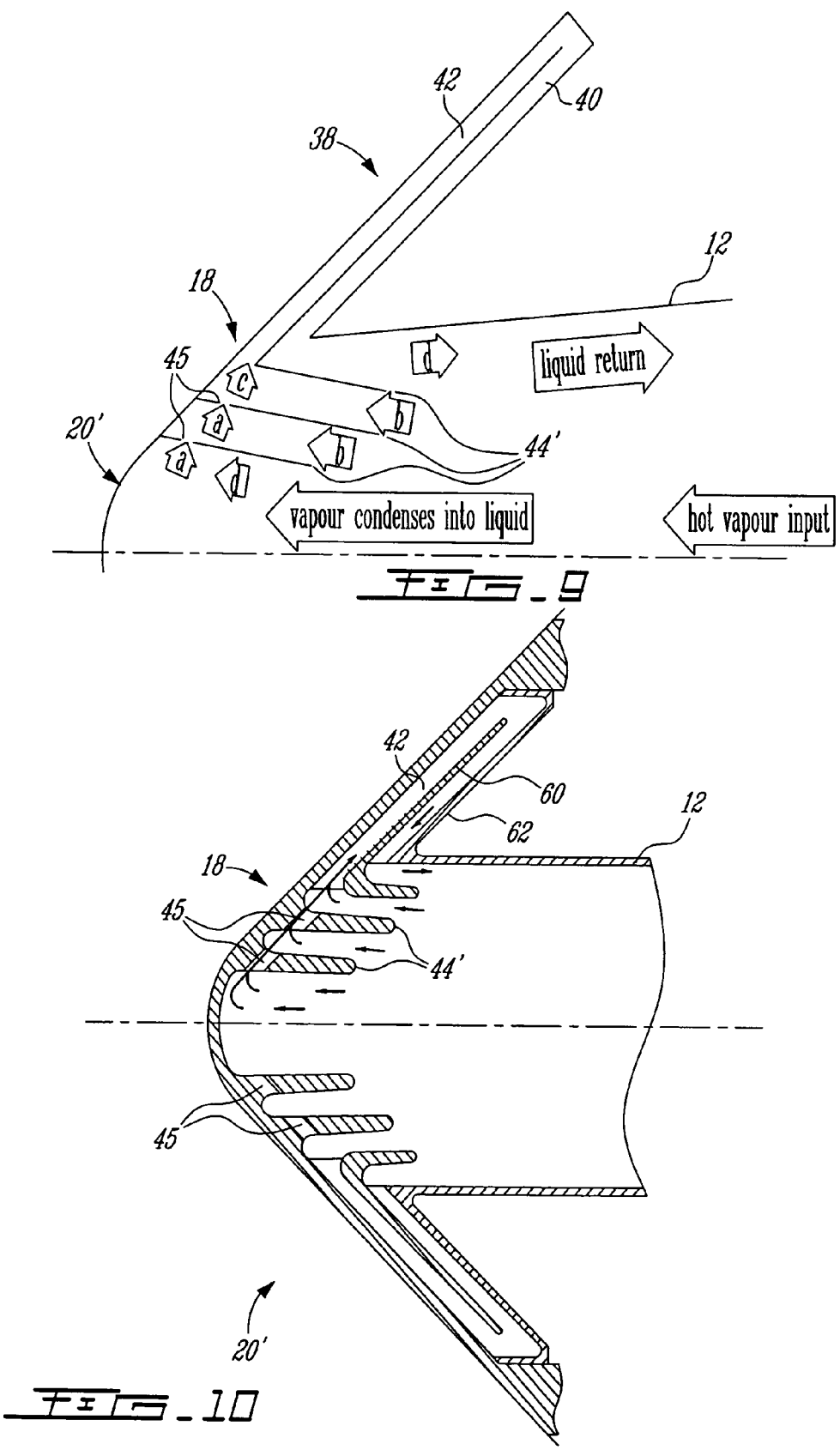

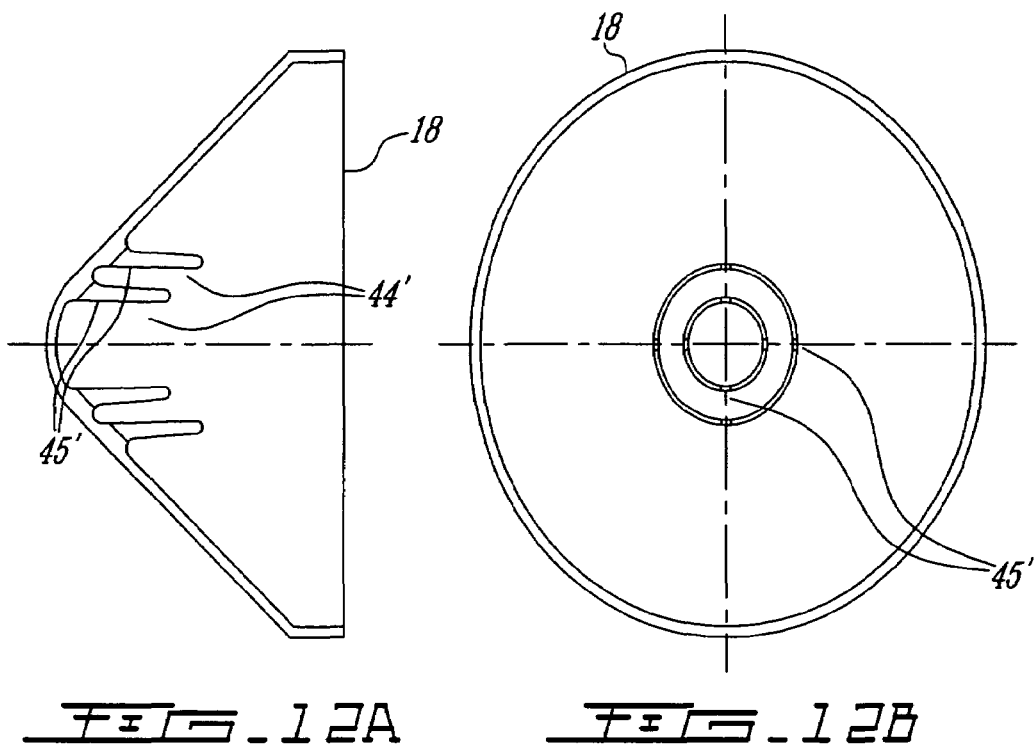
FIG._12A  FIG._12B
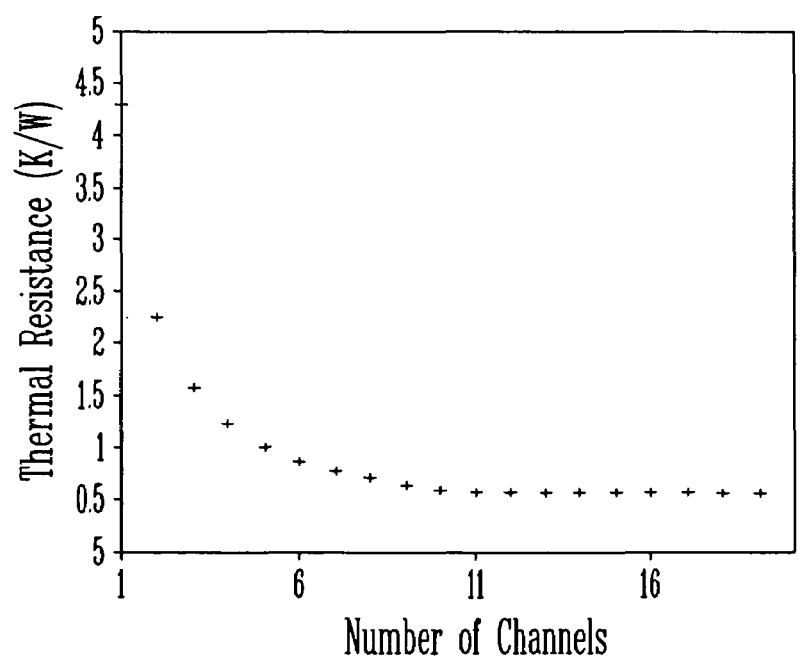
FIG._13

ANTI-ICING APPARATUS AND METHOD FOR AERO-ENGINE NOSE CONE

RELATED APPLICATION(S)

This application is a continuation of International Patent Application No. PCT/CA2005/000090 filed on Jan. 26, 2005, which claims benefit of Canadian Patent Application No. 2,456,563 filed on Jan. 30, 2004, which are herein incorporated by reference.

FIELD OF THE INVENTION

The present invention relates generally to aero-engines and, more particularly, to an anti-icing scheme for an engine nose cone.

BACKGROUND

Icing occurs when airplanes move through clouds of suspended water droplets that remain liquid at sub-zero temperatures. While smaller droplets follow the flow around the nose cone into the engine, the larger droplets tend to impact on the cone surface and freeze forming an undesirable layer of ice. Icing is typically prevented on small turbofan engines by blowing hot bleed air from the compressor into and over the nose cone to maintain it above the critical icing temperature. Although this method is effective, increased draw of compressor air reduces the thermodynamic performance of the gas turbine engine. It is an object of the present invention to provide an improved anti-icing system.

SUMMARY OF THE INVENTION

In one aspect the present invention provides an anti-icing apparatus for a aero-engine nose cone, the nose cone connected for rotation with a central shaft of the engine, the apparatus comprising: a heat pipe mounted for rotation inside the central shaft with an end of the heat pipe adjacent a central portion of the nose cone, the heat pipe containing a working fluid; a heat input apparatus adapted to provide heat to an opposite end of the heat pipe; and a condenser assembly (20) mounted intermediate the heat pipe and the nose cone, the condenser assembly (20) including a plurality of concentric annular condensing surfaces (44, 44') adapted to condense working fluid thereon.

In a second aspect the present invention provides an anti-icing apparatus for a aero-engine nose cone, the nose cone connected for rotation with a central shaft of the engine, the apparatus comprising: a heat pipe mounted for rotation inside the central shaft with an end of the heat pipe adjacent a central portion of the nose cone, the heat pipe containing a working fluid; a heat input apparatus adapted to provide heat to an opposite end of the heat pipe; and a condenser assembly mounted intermediate the heat pipe and the nose cone, the condenser assembly including a transport apparatus adapted to transport condensed working fluid from the heat pipe along a surface of the nose cone to a portion of the nose cone remote from the heat pipe.

In another aspect the present invention provides an anti-icing apparatus for a aero-engine nose cone, the nose cone connected for rotation with a central shaft of the engine, the apparatus comprising: a heat pipe mounted for rotation inside the central shaft with an end of the heat pipe adjacent a central portion of the nose cone, the heat pipe containing a working fluid; a heat input apparatus adapted to provide heat to an opposite end of the heat pipe; and a condenser assembly fluidly communicating with the heat pipe and adapted to condense the working fluid; and an anti-icing assembly in fluid communication with the heat pipe but external to the heat pipe, the anti-icing assembly adapted to direct condensed working fluid away from the heat pipe to at least a portion of the nose cone radially outward of the central shaft.

In another aspect the present invention provides an anti-icing apparatus for a aero-engine nose cone, the nose cone connected for rotation with a central shaft of the engine, the apparatus comprising: a heat pipe mounted for rotation inside the central shaft with an end of the heat pipe adjacent a central portion of the nose cone, the heat pipe containing a working fluid; a condenser assembly intermediate the heat pipe and nose cone for anti-icing the nose cone; and an evaporator adapted to provide heat to an opposite end of the heat pipe, the evaporator including a jacket portion substantially enveloping an opposite end of the heat pipe, the jacket portion in fluid communication with a source of heated fluid in the engine, the jacket portion adapted to direct the heated fluid around the heat pipe to thereby evaporate the working fluid in the heat pipe.

In another aspect the present invention provides a method of anti-icing an aero-engine nose cone, the engine including at least a nose cone mounted for rotation with a central shaft of the engine and a rotating heat pipe associated with the central shaft, the heat pipe containing a working fluid, the method comprising the steps of evaporating the working fluid, condensing the working fluid, directing condensed working fluid away from the heat pipe and into contact with the nose cone to providing anti-icing heat to the nose cone, and returning the condensed working fluid to the heat pipe.

Still other aspects of the present invention will be apparent upon inspection of the full disclosure now provided, and the above summary is not therefore exhaustive of the inventive aspects of the subject herein disclosed.

BRIEF DESCRIPTION OF THE FIGURES

FIGS. 2a and 2b: a typical gas turbine engine incorporating the present invention.

FIG. 3: The rotating heat pipe nose cone anti-icing concept may be conceptualized as a series of thermal resistances where the difference between the hot engine source and the ambient is the potential.

FIG. 4: A somewhat schematic cross-sectional view of an embodiment of the present rotating heat pipe aero-engine nose cone anti-icing concept.

FIGS. 6a, 6b and 7: enlarged cross-sectional views of the condenser of FIG. 5.

FIG. 8: Schematic cross-sectional view of an alternate embodiment of the condenser of FIGS. 6a and 6b.

FIG. 9: enlarged view of portion of FIG. 8.

FIG. 10: A somewhat less schematic cross-sectional view of the device of FIG. 8.

FIGS. 12a and 12b: Cross-sectional and end views of an alternate embodiment of the nose cone of FIG. 8.

FIG. 13: a graph showing sensitivity to number of heating channels.

DETAILED DESCRIPTION OF THE PREFERRED EMBODIMENTS

Figure 1:
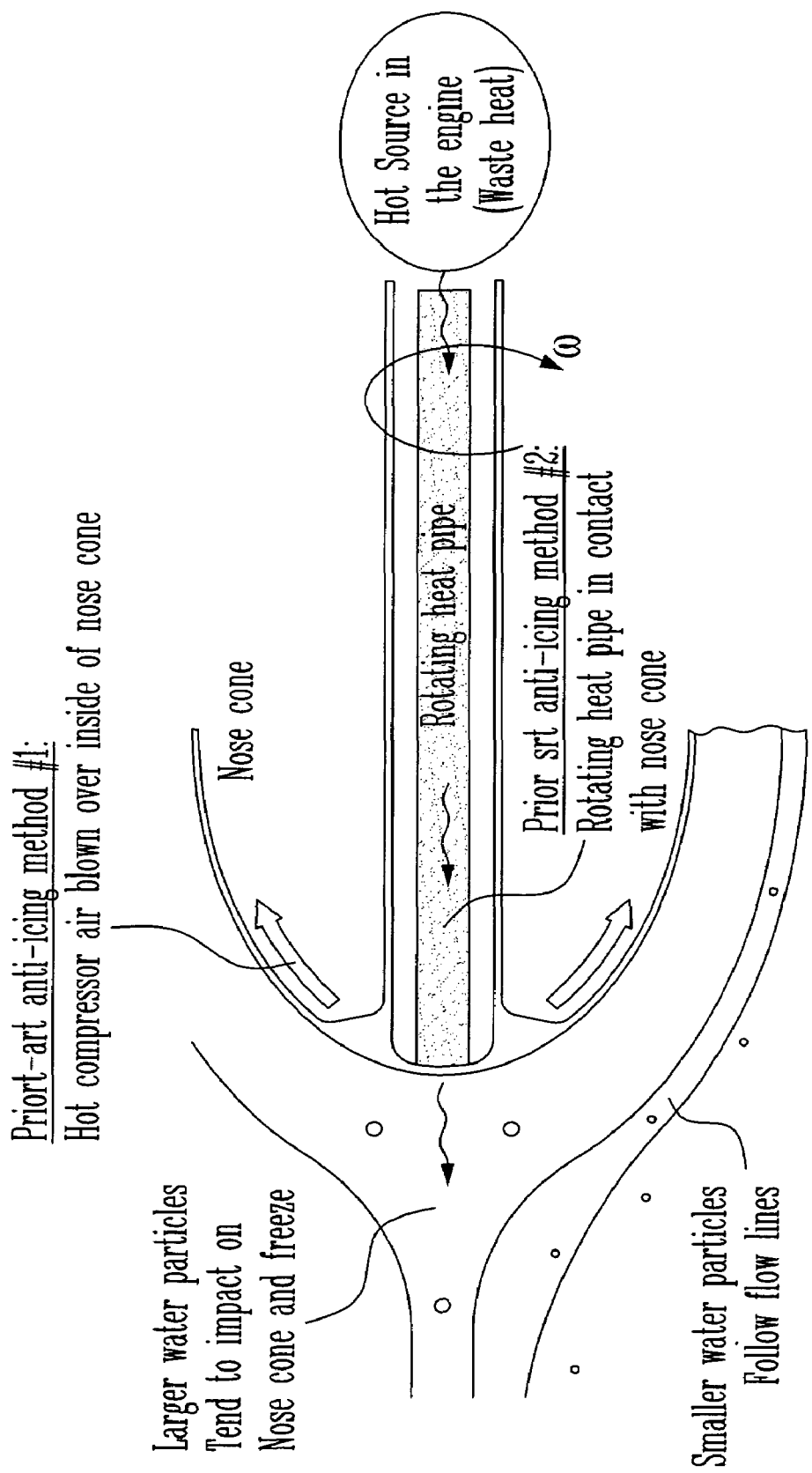
FIG. 1: Prior art nose cone anti-icing concepts.
Figure 2A:
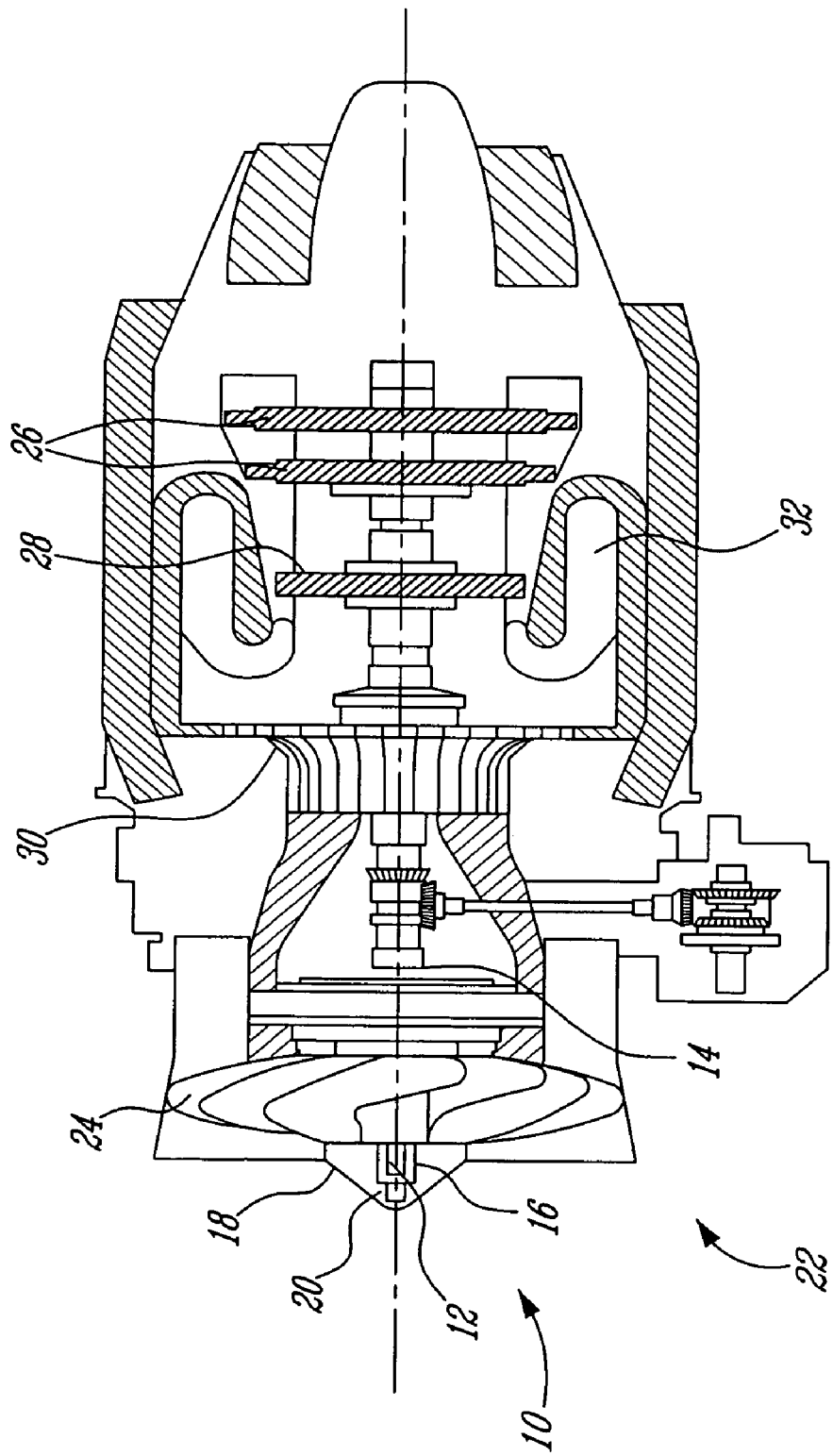

Referring to FIGS. 2a and 2b, a new aero-engine nose cone anti-icing system 10 using a rotating heat pipe 12 is shown. As will be described in more detail below, the rotating heat pipe 12 transports engine heat, provided to the heat pipe 12 through an evaporator 14, interiorly through an aero-engine central shaft 16 to the engine's nose cone 18 to maintain it above a critical icing temperature, and a condenser apparatus 20 is provided to assist in distributing heat from the heat pipe 12 to the nose cone surface. The aero-engine 22 in this embodiment is a gas turbine turbofan engine, having a fan 24 mounted for rotation on the central shaft 16, the central shaft 16 being driven by a low pressure turbine 26, while a high pressure turbine 28 drives a high pressure compressor 30, both turbines 26, 28 being driven as a result of the combustion of a fuel-air mixture in a suitable combustor 32. Referring to FIG. 1, in use as the aero-engine passes through air with suspended water-vapour, in certain conditions the water vapour will undesirably freeze on the nose cone.

Referring now to FIG. 4, the invention employs preferably waste engine heat which is transported along the rotating heat pipe 12 through the central fan shaft 16 to the engine nose cone 18 to maintain the outer nose cone surface above the critical icing temperature. In addition, the rotating heat pipe 12 can be used for engine thermal management while eliminating the use of prior art compressor bleed air for anti-icing, as will be discussed further, below.

Figure 5:
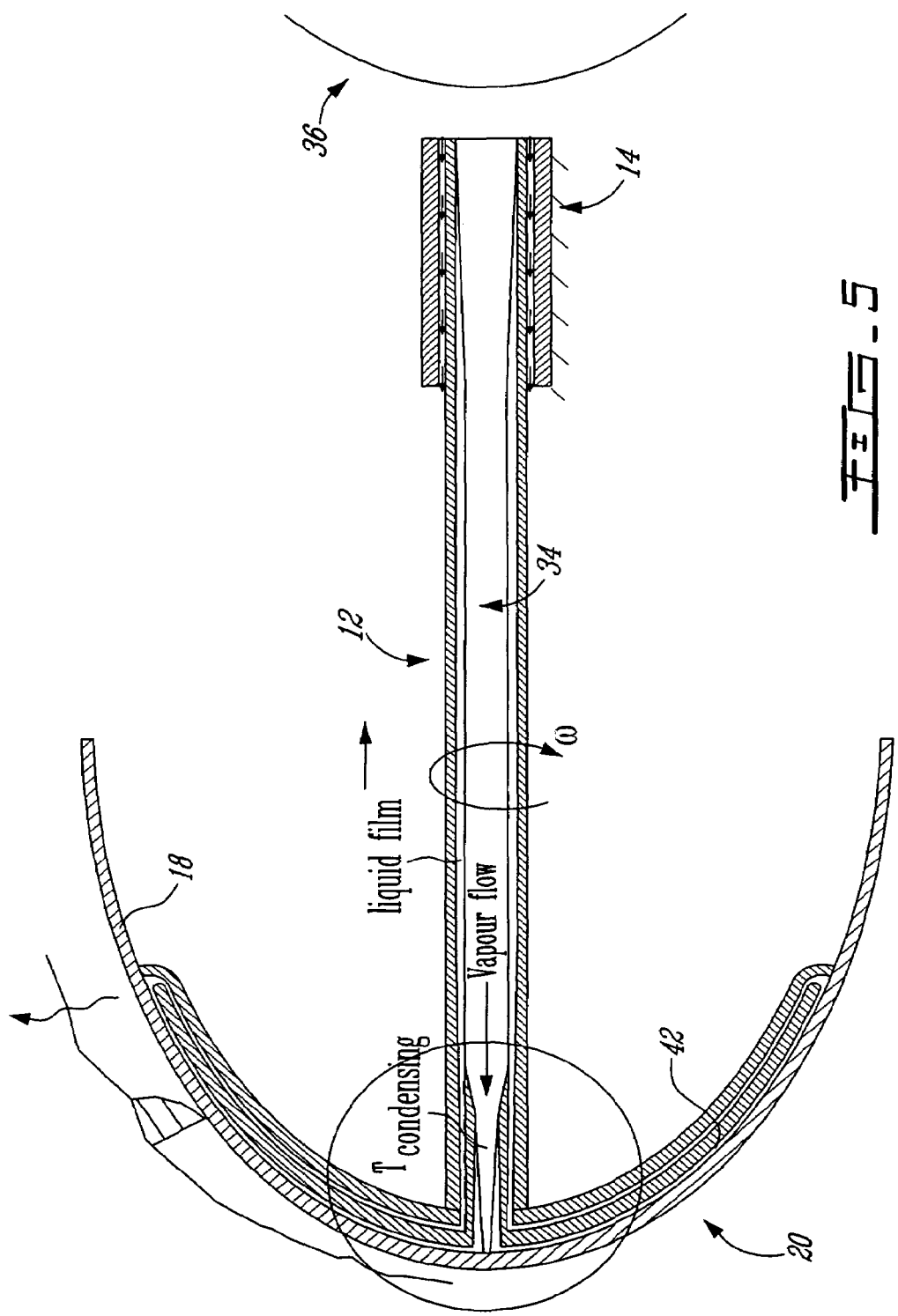
FIG. 5: A somewhat less schematic cross-sectional view of the concept of FIG. 4.

The rotating heat pipe 12 is preferably a closed hollow cylinder containing a charge of working fluid 34 and is conceptually divided into three sections along its length (see FIG. 5), namely an evaporator portion 14 in contact with the heat source 36, an adiabatic transport section (referred to herein as the "heat pipe"), and condenser portion. For analysis and design purposes, the anti-icing system 10 may be modelled as a thermal resistance network as shown in FIG. 3, or in any other suitable manner. The temperature difference between the hot source 36 in the engine $T_{hot\ source}$ and the ambient air $T_{inf}$ defines the overall heat transfer driving potential. The thermal resistance of each component determines the intermediate temperatures throughout the system 10 and in combination the system heat transfer. One general constraint on the anti-icing system 10 is that the overall heat transfer must be sufficient to prevent ice accumulation over the critical area of the nose cone 18 given feasible heat sources in the aero-engine 22. For the preferred embodiments described herein, the engine heat source is preferably about $T_{hot\ source}$ ~100° C. and the ambient air may be as low as $T_{inf}$ ~40° C., yielding a system temperature difference on the order of 140° C. Nose cone surface temperatures of 3° C.-10° C. are typically required to ensure prevention of icing on a body in all environmental conditions. This temperature range constrains the minimum nose cone surface temperature. Hence, the total system heat transfer required or the heat load can be determined according to known techniques from knowledge of the boundary layer flow over the nose cone 18.

Referring again to FIG. 4, in use, during high speed rotation of the aero-engine central shaft 16 and the heat pipe 12, the liquid phase in the heat pipe 12 forms an annular film on the inside wall surface of the heat pipe 12, and travels along the inside wall from the condenser 20 to the evaporator 14 where the latent heat is absorbed and vapour is generated, which vapour is returned centrally through the pipe 12 to the condenser 20 for another cycle, as will be understood by the skilled reader. Rotating heat pipes are typically cylindrical or tapered along their lengths, with respect to the interior wall profile, to direct working fluid flow within the heat pipe, although other geometries have been used. A cylindrical rotating heat pipe has a uniform cross section along the length, while a tapered rotating heat pipe employs a small taper in the condenser section that provides an additional centrifugal force component in the axial direction to drive the liquid film back to the evaporator. Though either will work, the tapered geometry is preferred in the present device because it significantly increases the heat transfer performance of the device.

As mentioned above, and referring now to FIG. 5, the present rotating heat pipe anti-icing system 10 includes at least three sub-systems, namely the rotating heat pipe 12 within the central shaft 16 of the engine 22, a preferably compact-style heat exchanger or evaporator portion 14 for heat transfer from a hot source 36 preferably in the engine to the heat pipe 12, and a condenser portion 20 including a heat distribution system to disperse the energy from the heat pipe 12 to the nose cone 18.

The rotating heat pipe 12 is located in the aero-engine central shaft 16 and as such has constraints on the heat pipe's basic size (see FIG. 2b). For the particular aero-engine 22 considered here, namely a small gas turbine engine, the aero-engine central shaft 16 limits the outer diameter of the rotating heat pipe 12 to about one inch. This geometric constraint imposes limitations on the amount of fluid that can be charged in the heat pipe cavity and the centrifugal forces in the liquid film returning the liquid to the evaporator 14. Moreover, the surface area through which heat transfer occurs at the evaporator 14 and condenser 20 are also limited by this geometric constraint. A summary of typical parameters found in typical small gas turbine aero-applications are shown in Table 1 (the values shown are typical, but not considered to be limiting to the scope of the present invention):

TABLE 1

The typical range of parameters in small gas turbine aero-engine applications.

| | |
|---|---|
| Airplane Speed | 300-600 KM/H |
| Engine Speed | 10000-30000 RPM |
| Ambient air temperature ($T_{inf}$) | 0° C.--40° C. |
| Engine waste heat source ($T_{hot\ source}$) | ~100° C. |
| Nose cone | ~3.5" length × 6" base diameter, 2 mm thick Aluminum. |
| Rotating Heat Pipe | 1" diameter limited by space in engine central shaft. |

The high speed rotating heat pipe 12 may be designed in any suitable fashion, for example the model developed by Song et al. (F. Song, D. Ewing, C. Y. Ching, "Fluid Flow and Heat Transfer Model for High Speed Rotating Heat Pipes," International Journal of Heat and Mass Transfer, Vol. 46, pp. 4393-4401, 2003) may be used to design and characterize the thermal resistance of the rotating heat pipe 12.

Two variables to consider when designing a rotating heat pipe are the fluid loading which is the amount of working fluid charged in the heat pipe and the condenser wall taper angle. In the present design, minimizing the rotating heat pipe total thermal resistance is of interest over the rotation speed range of the application. In the presently described embodiment, a 1" outer diameter rotating heat pipe 12 was provided with 0.125" thick walls, and the condenser 20, heat pipe and evaporator sections 12 and 14 are 4.5", 7.25", and 4" in length respectively. In the case of a taper in the condenser 20, the wall thickness was 0.125" at the heat pipe section 12 and increased through the condenser section 20 to the end cap.

In designing the present system, sufficient heat must not only be delivered to the nose cone 18 but such heat must also be distributed effectively over the desired area of coverage, which impacts the condenser design. Preferably heat is extracted from the rotating heat pipe condenser section 20 and dispersed in the nose cone 18 in such a way that the minimum surface temperature constraint is satisfied with minimal imposed thermal resistance.

Referring to FIG. 1, in the prior art the condenser end of the rotating heat pipe was in direct conductive contact with the inside pole region of the nose cone. It has been found, however, that the nose cone temperature decreases to well below freezing immediately outside the contact area indicating that conduction alone is insufficient for anti-icing. The conduction heat transfer has been found to be insensitive to initial temperature over the contact region. The heat transfer from the heat pipe condensing surface to the ambient air flowing around the nose cone is limited by conductivity. A new condenser with higher heat transfer capability is therefore required.

Figure 6A:
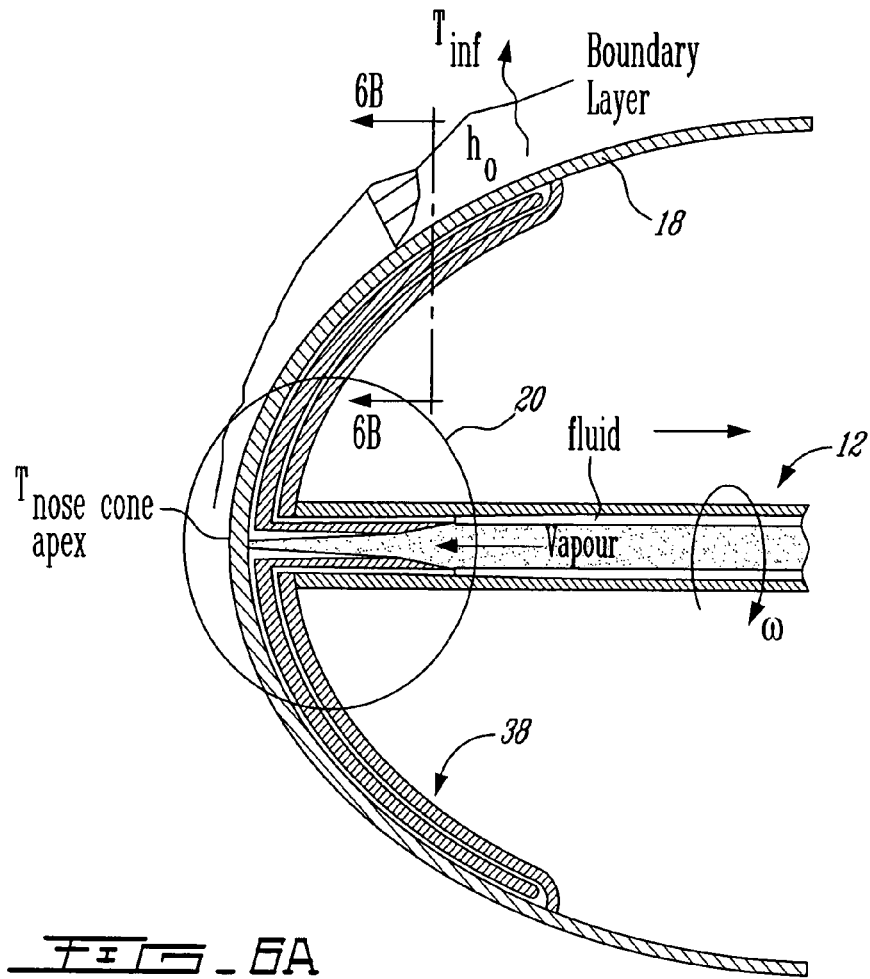
Figure 6B:
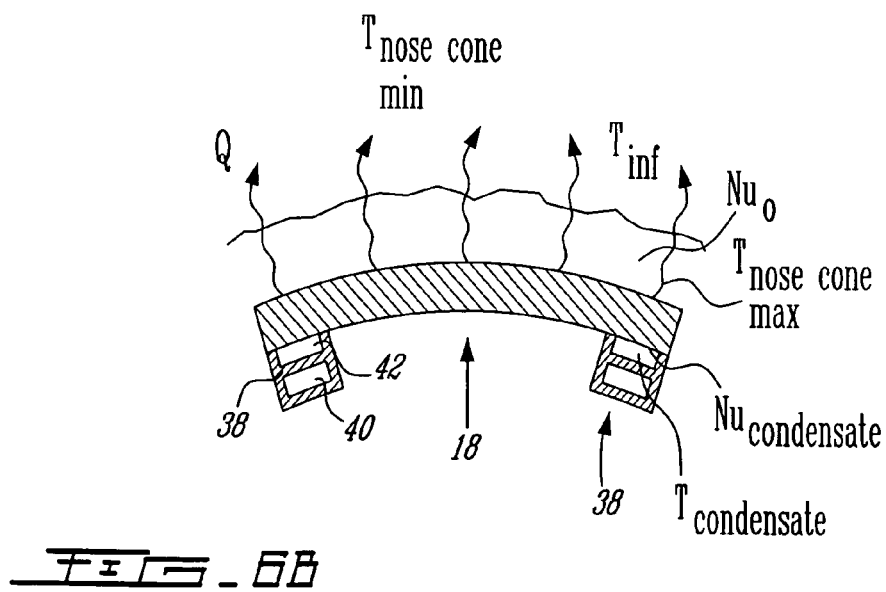

Referring now to FIGS. 6a, 6b and 7, one embodiment of the condenser 20 will now be described. To overcome the prior art problems, the present invention provides in one aspect a heating channel arrangement 38 to distribute heat more effectively to regions removed from the heat pipe 12 and apex region of the nose cone 18. The condensed working fluid is drawn from the heat pipe 12 along the inside nose cone surface through radially spaced heating channels 38, as illustrated in FIGS. 6a and 6b to transfer the fluid along the nose cone inner surface. A return, or "out", channel 40 is also provided to return the working fluid back to the heat pipe 12. In this embodiment, the return or "out" channel 40 is provided on top of the primary or "in" heat channel 42, as shown in FIG. 6b. The heating channels 38 in this embodiment are radially-spaced and radially oriented, with the primary heating channel 42 extending radially away from the central area of the nose cone 18 preferably to a peripheral portion of the nose cone 18, where the channel 42 then turns back on itself and the return portion 40 of the channel is disposed on the primary channel 42 as the return channel 40 tracks back towards the direction of the centre of the nose cone 18, where it ultimately communicates preferably with an outer diameter portion of the heat pipe 12, for directing the working fluid back to the inner wall portion of the heat pipe 12.

Referring still to FIG. 7, the condenser 20 includes a condensing surface 44 which is provided to facilitate formation of working fluid condensate, and which is preferably slightly outwardly conically-shaped in the direction of the nose cone 18, so as to beneficially employ centrifugal effects due to rotation of the assembly to direct the fluid condensate towards the inlets 46 of the heating channels 42. The condenser entry leading edge 48 preferably has a relatively acute angle, preferably providing a sharp or "knife" edge at the leading edge of the entry portion 50 to provide flow stability by impeding local vortices that could make the vapour flow unstable and increase pressure loss in the condensing area. The same result may be achieved using configurations other than a sharply acute leading edge, such as for example by appropriately rounding the leading edge of the condenser inlet.

In use, hot vapour inside the heat pipe 12 enters the annular region of the condenser 20 shown in FIG. 7, where condensation occurs due to cooler temperatures as the liquid condensate flow approaches the inside pole region of the nose cone 18. The pressure due to rotation on the condensate formed towards the inner portions of the condenser 20 is higher than the pressure of the condensate towards the outer diameter portions of the condenser 20, which thereby creates a pumping effect which directs condensate outwardly. This action and centrifugal action drives the condensate outwardly through the heating channel inlets 46 into the heating channels 42, where the condensate is directed outwardly along the inside surface of the nose cone 18. Sub-cooling of the working fluid provides heat to the nose cone material. Passage of the condensate through the heating channels 42 therefore brings the fluid-borne heat close to the surface of the nose cone 18 to provide anti-icing heat. The channels 42 then discharge the sub-cooled condensate via the return portion 40 of the channels to the inside wall of the heat pipe 12 for return to the evaporator 14 (described below). The engine (i.e. shaft) rotation speed $\omega$ and height difference $z_o$-$z_i$ between the channel outlet ($z_o$) and free surface of the liquid film at the channel inlet ($z_i$) are parameters which may be varied to affect circulation through the channels 38.

In the presence of the heating channels 42, the nose cone 18 is essentially an enhanced fin and the thermal resistance may be characterized by the temperature difference $T_{cond}$-$T_{inf}$ and the total heat transfer. Using the resistance model shown in FIG. 3, one could describe the resistance of the condenser 20 and the resistance on the nose cone exterior in combination as the enhanced fin resistance because the condenser 20 is preferably an integral part of the nose cone 18 itself in this design. The effect of the number of channels 42 on the total thermal resistance for the nominal case of 10000 rpm engine speed and 300 km/h airplane speed is shown in FIG. 13. In the embodiment described here, the use of twelve (12) radial heating channels 42 is preferred.

The channels 42 are disclosed herein as an anti-icing system of the present invention. However, the anti-icing system of course need not be a channel or channels at all, but any suitable mechanism for directing cool working fluid away from the heat pipe 12 and along the nose cone 18. For example intrinsic conduits (not shown) may be provided in the nose cone 18, or a jacket-type fluid direction system, wherein working fluid is directed over a larger surface area of the nose cone 18. In respect of the channelled anti-icing system 10 described specifically above, the channel arrangement 38 need not be radially spaced channels, but any channel geometry and/or distribution which provides a suitable heat distribution to the nose cone 18 may be employed. For example, channels in a spiral geometry or serpentine geometry or other suitable geometry may be employed around the nose cone surface from the apex to the base may be used. Preferably the spacing between adjacent channels 42 is provided to also maintain the nose cone surface above the critical icing temperature in the regions between adjacent channels 42. Multiple channels may not be provided, but rather a single channel. As mentioned, channels are preferred, but need not be provided at all, but rather replaced with any suitable apparatus for transporting working fluid along a nose cone surface.

The ideal fluid loading for a rotating heat pipe is the amount of working fluid needed such that the film thickness at the evaporator end cap is zero; preferably the entire inner wall surface is wetted. In the described embodiments, the rotating heat pipe 12 operates over a range of speeds, and, thus the ideal fluid loading at the lowest speed (e.g. 10000 rpm) is preferably the limiting case in order to avoid dry-out, thus a fluid loading of 150% for example, is relative to the ideal loading at 10000 rpm. The condenser taper angle is preferably 1.5° at 10000 rpm and 2° at 15000 rpm and remain at approximately 2° over the remaining majority of the range. As with all practical designs however, safety factors are standard and in this case non-ideal fluid loading would likely be necessary in order to avoid dry out in the real application. The preferred condenser taper angle occurs at approximately 2° for the case of 150% fluid loading over the rotation speed range.

The heat load required to prevent ice accumulation on a body, particularly on fixed wings, may be estimated using computational fluid dynamic techniques or determined experimentally, as is known in the art. See, for example, G. Croce, H. Beaugendre, W. G. Habashi, "CHT3D: Fenspar-Ice Conjugate Heat Transfer Computations With Droplet Impingement and Runback Effects", MIA paper 02-0386, 2002, and R. Connell, D. Ewing, C. Y. Ching, "Estimation of the Anti-Icing Heat Load for the Nosecone of an Aeroengine," Canadian Society of Mechanical Engineers (CSME) Forum, 2002.

Figure 14:
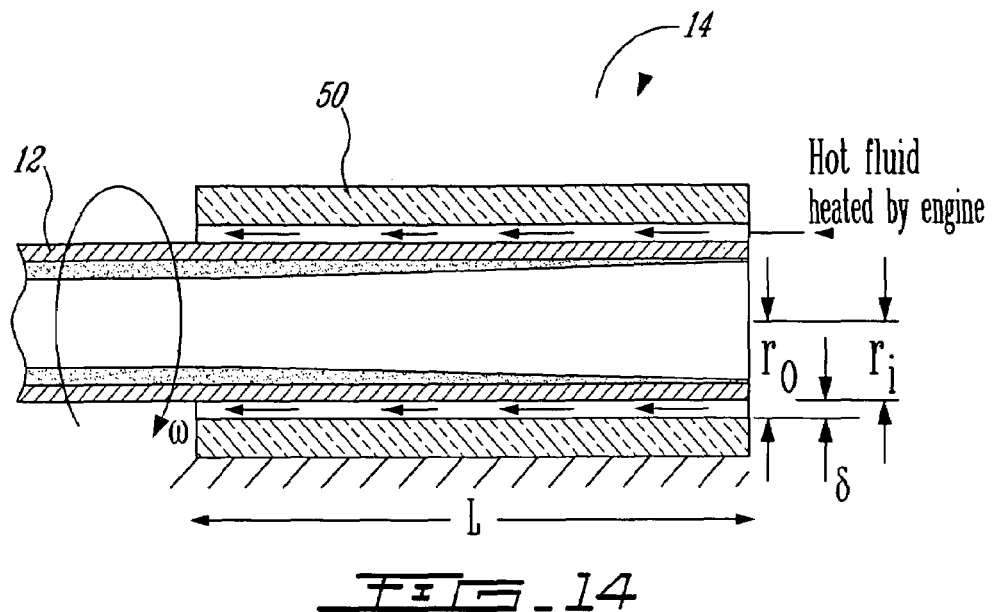
FIGS. 14 and 15: Schematic views of embodiments of the evaporator.
Figure 15:
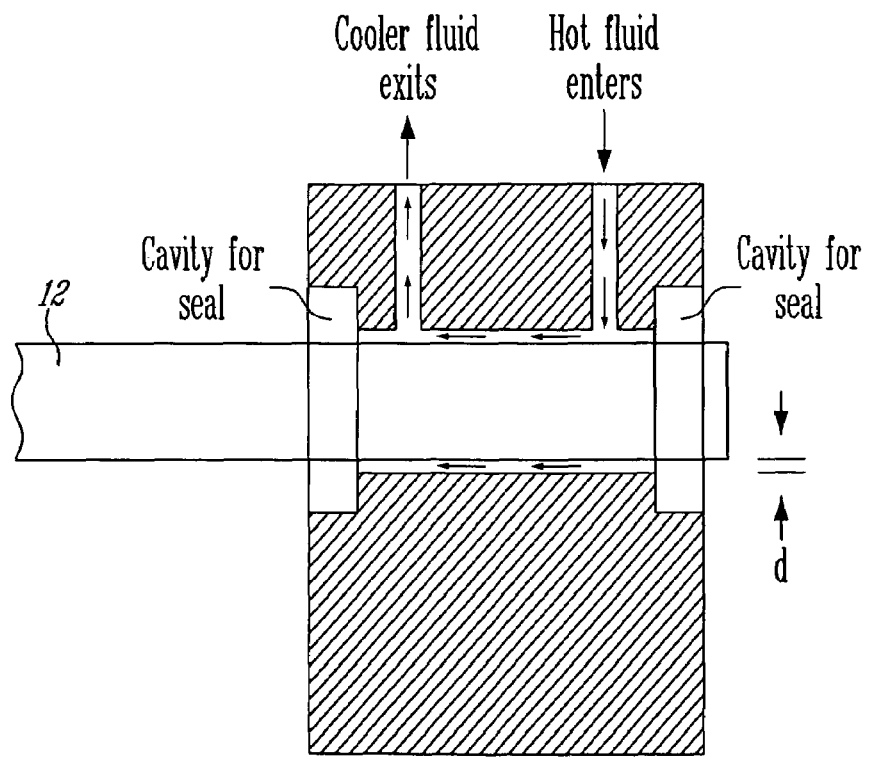

Heat must, of course, be provided to the heat pipe input end, and thus an appropriate evaporator 14 is provided, as will now be described. Referring to FIGS. 14 and 15, the general evaporator concept presented in this application includes a stationary "jacket" 50 that surrounds the evaporator section of the rotating heat pipe 12, separated by a thin gap through which a fluid heated by the engine is circulated. As is apparent from FIGS. 14 and 15, several modes of providing and withdrawing the fluid are available. The heated input fluid is preferably provided by the engine 22 (e.g. directly, through hot engine air or a hot engine liquid such as oil or fuel, or indirectly though an engine heat exchanger, etc.) and preferably waste heat is used, although a dedicated heater, such as an electric heater (not shown) may also be provided around or adjacent the heat pipe 12 to heat a fluid for contacting the heat pipe 12 (direct contact between the hot fluid and the heat pipe 12 is preferred to provide optimal heat transfer). The skilled reader will recognize that still other sources of engine heat are available for use with the present invention. In the presently-described aero-engine embodiment, with a range of rotation speeds is 10000 rpm-30000 rpm, a gap size (6) is about 0.1" due largely to space limitations inside the central shaft area of the aero-engine. Gap size, fluid temperature and fluid flow rates, are among the variable the designer may adjust to provide the desired heat input into the heat pipe 12. The flow regime in the evaporator 14 is preferably of the turbulent plus vortices type.

Referring to FIGS. 8-11, another embodiment of a condenser 20' according to the present invention includes one or more condensing surfaces 44' inside the heat pipe 12 (i.e. preferably at a smaller diameter than the heat pipe inside diameter) and preferably these surfaces are annular and slightly outwardly conical in shape. The condensing surface(s) 44' are also provided with a plurality of holes 45 therethrough which permit condensed fluid to pass therethrough. The condensing surfaces 44' are inclined in the direction of the draining holes 45 to assist in directing the working fluid condensate forward to the area of the holes 45. Each condensing surface 44' preferably has a knife-edge or other shaped leading edge, as described in respect of the embodiment above, to help minimize the inlet pressure losses, as previously discussed.

Referring particularly now to FIG. 9, in use, in this embodiment, as with the previous embodiment, fluid condenses as it comes in contact with the cool nose cone 18, as before and pressure due to rotation on the condensate creates a pumping effect which directs condensate outwardly (see arrows "a") towards the heating channels 42 in the nose cone 18, and then into (see arrow "c") through the channels 42 to the channel outlet 40 (see arrow "d"). Any fluid condensing on the condensing surfaces (see arrows "b") is thus directed outwardly (i.e. and thus forwardly) along the conical condensing surface 44' of the condenser 20 towards the holes 45, and then through the holes 45, and ultimately to a heating channel inlet. The fluid is then circulated through the heating channels 42 and returned to the heat pipe 12, as before. The number and position of holes 45 around the circumference of a condensing surface 44' may be as desired, and need not necessarily be the same as the number or position of the heating channels 42.

Figure 11A:
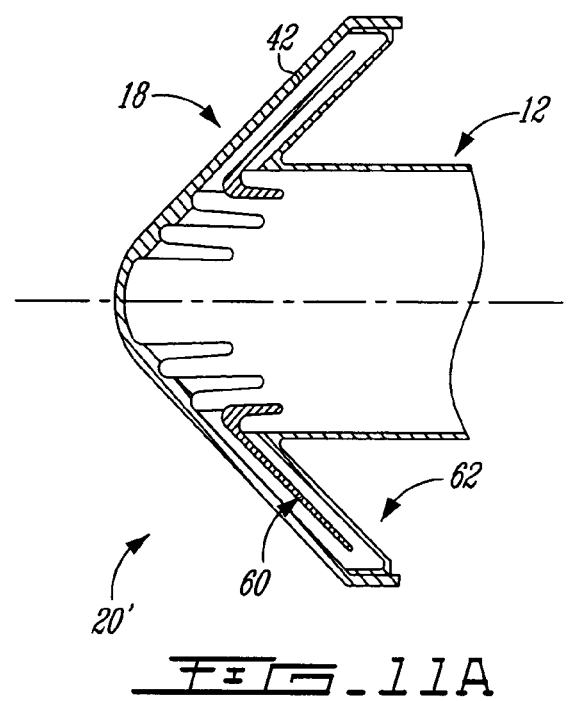
FIG. 11a and 11b: Assembled and exploded versions of FIG. 10, showing components of the embodiment.
Figure 11B:
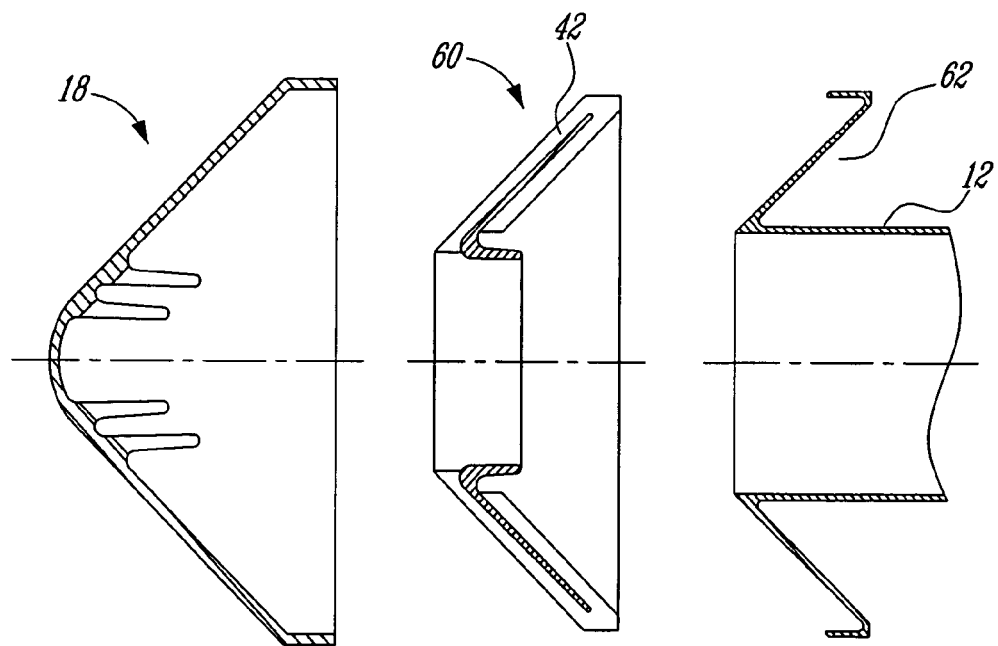

Referring now to FIGS. 11a and 11b, a preferred manner of providing a condenser assembly is depicted. The condenser assembly 20' includes a nose cone portion 18, an intermediate insert portion 60, and end cap portion 62 which is preferably mating or joined with the heat pipe 12. Condensing surfaces are preferably provided on both the nose cone portion 18 and the insert portion 60. The heating channels 42 are preferably provided in the insert 60, and the end cap 62 and the nose cone 18 mate to protect the interior insert 60. Alternately, though not shown, when assembled the nose cone portion 18, the insert portion 60 and the end cap portion 62 may instead co-operate to form the channels 40, 42. The skilled reader will, of course, also recognize that the condenser embodiments disclosed herein may be constructed in a variety of ways, and the above design is just one of many possibilities.

Referring now to FIGS. 12a and 12b, in a further embodiment, the holes may be provided as slots 45' in the condensing surfaces, instead of holes per se, and thus the slots 45' permit the condensate forming on condensing surfaces 44' to ultimately travel to a heating channel inlet.

The approach of the present invention is a considerably more efficient transfer of heat than the prior art. This approach also achieves sub cooling of the condensate which leads to higher temperature difference for the heat pipe 12, resulting in better heat pipe operation. The transfer of heat of the present invention provides not only the required anti-icing but also cooling air the engine—air which may be used for turbine or combustor cooling, or other cooling within the engine. The result is an improvement of the engine performance over prior art systems.

Further description of the design, modelling and analysis of the structure of the present invention is provided in Appendix A hereto.

Although described with respect to a turbofan engine, the present invention may be applied with advantage to any aero-engine having a nose cone requiring anti-icing measures. Moreover, the size and configuration of the exemplary aero-engine are for description purposes only, and the invention may be employed, with such modification as will be apparent to the skilled reader, to any suitable engine size and/or configuration. Furthermore, the embodiments described are intended to be exemplary of a broader concept which may be implemented in a variety of different ways to achieve the same result. Some possible modifications are described above, but such description is not intended to be exhaustive, and therefore there are of course numerous other modifications which will be apparent to the skilled reader which do not depart from the general scope of the invention disclosed herein. As such, the appended claims are intended to encompass such modifications as are apparent to the skilled reader.

What is claimed is:

1. An anti-icing apparatus for an aero-engine nose cone, the nose cone connected for rotation with a central shaft of the engine, the apparatus comprising:

a heat pipe mounted for rotation inside the central shaft with an end of the heat pipe adjacent a central portion of the nose cone, the heat pipe containing a working fluid;

a heat input apparatus adapted to provide heat to an opposite end of the heat pipe; and a condenser assembly mounted intermediate the heat pipe and the nose cone, the condenser assembly including a transport apparatus adapted to transport condensed working fluid from the heat pipe along a surface of the nose cone to a portion of the nose cone remote from the heat pipe; wherein the transport apparatus comprises a plurality of generally radially-extending conduits.

2. The anti-icing apparatus of claim 1, wherein the transport apparatus includes at least one conduit adapted to permit working fluid to pass therethrough.

3. The anti-icing apparatus of claim 1, wherein the transport apparatus is further adapted to return the working fluid to the heat pipe.

4. The anti-icing apparatus of claim 1, wherein the central portion of the nose cone is radially outward of the heat pipe relative to a heat pipe central axis.

5. The anti-icing apparatus of claim 1, wherein the central portion of the nose cone includes a peripheral portion of the nose cone.

6. The anti-icing apparatus of claim 1, wherein the condenser assembly includes a portion of the nose cone.

7. The anti-icing apparatus of claim 1, wherein the plurality of generally radially-extending conduits comprises a primary heating channel disposed along an interior surface of the nose cone, the primary heating channel extending radially away from the central portion of the nose cone.

8. The anti-icing apparatus of claim 7, wherein the primary heating channel extends to a peripheral portion of the nose cone where the primary heating channel turns back towards the heat pipe into a return channel disposed on top of the primary heating channel.

9. The anti-icing apparatus of claim 8, wherein the return channel extends radially inwardly to the heat pipe, the return channel being in fluid flow communication with an outer diameter portion of the heat pipe.

10. The anti-icing apparatus of claim 1, wherein the plurality of generally radially-extending conduits comprises a return channel provided on top of a primary heating channel disposed along an interior surface of the nose cone.

* * * * *